F. GIESENHAUS.
FISH GUARD.
APPLICATION FILED JULY 23, 1913.
1,087,163.
Patented Feb. 17, 1914.
2 SHEETS—SHEET 2.
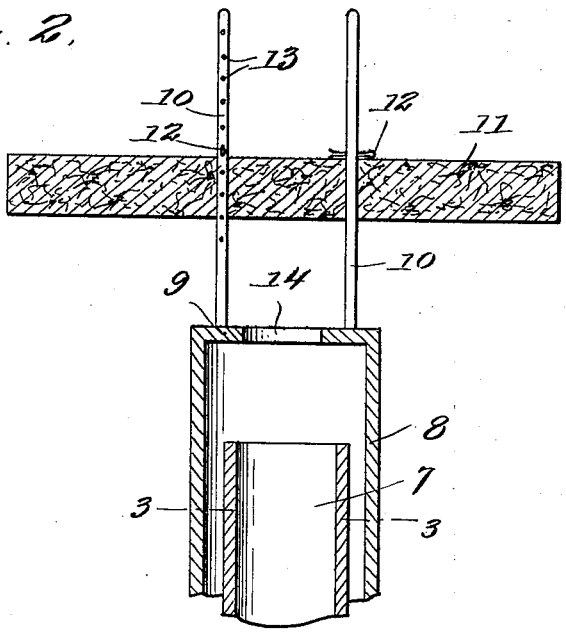
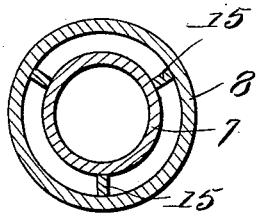
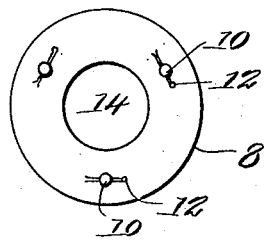
Witnesses
J. O'Connell
W. E. Valk Jr.
Inventor
Fred Giesenhaus,
By Richard Owen,
his Attorney

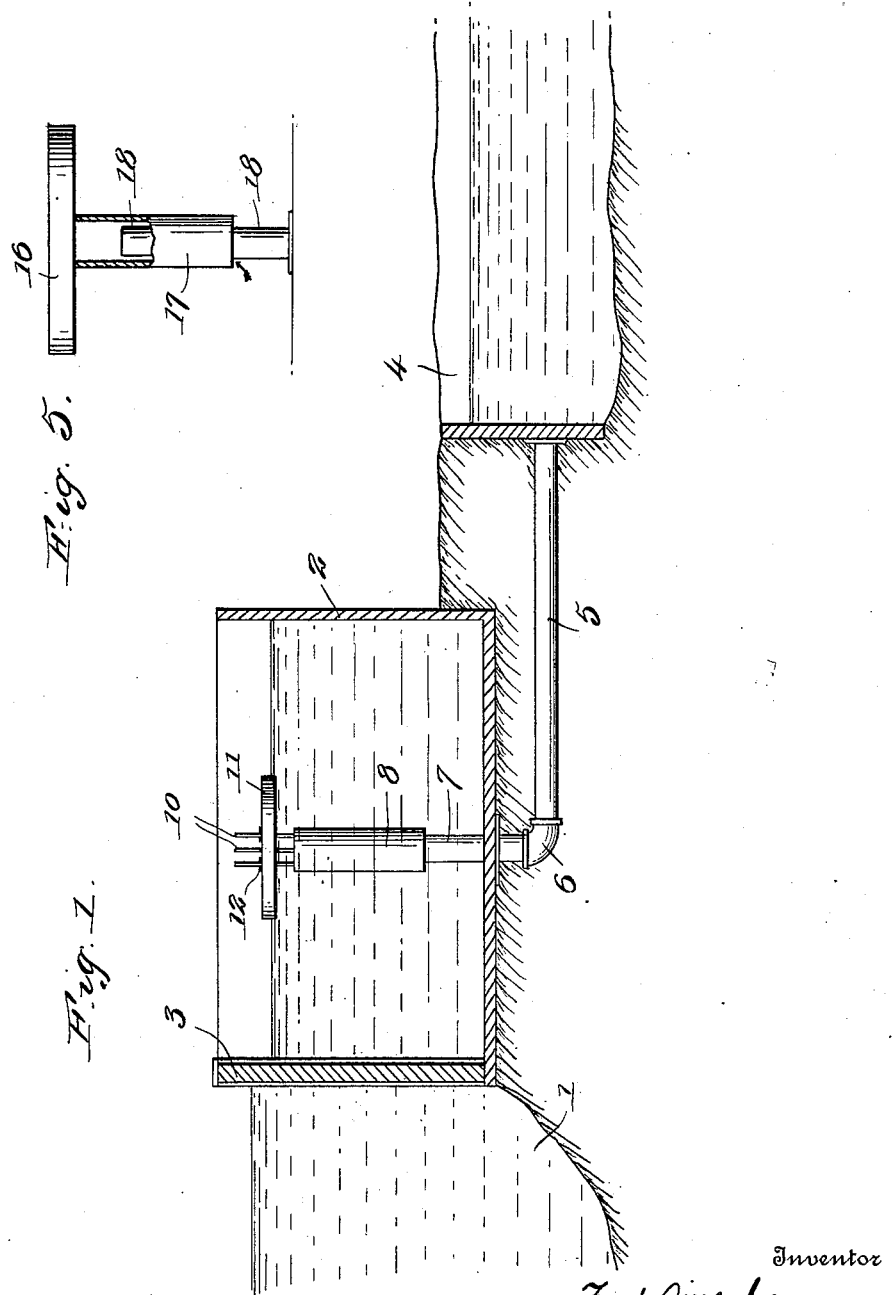

UNITED STATES PATENT OFFICE.

FRED GIESENHAUS, OF MUSCATINE, IOWA.

FISH-GUARD.

1,087,163.  Specification of Letters Patent.  Patented Feb. 17, 1914.

Application filed July 23, 1913. Serial No. 780,781.

*To all whom it may concern:*

Be it known that I, FRED GIESENHAUS, citizen of the United States, residing at Muscatine, in the county of Muscatine and State of Iowa, have invented certain new and useful Improvements in Fish-Guards, of which the following is a specification.

This invention relates to an improved fish guard or screen.

The primary object of the invention is to provide improved means to prevent the entrance of fish into irrigating ditches, the said means comprising an adjustable or movable pipe section arranged to partially close the inlet pipe of the irrigating ditch, the water supply for the latter being received by way of the said inlet pipe from a tank or receptacle within which the device comprising my invention is arranged.

It is a well known fact that a great number of fish enter the irrigating ditches during the filling thereof, and as the water in the ditches becomes stagnant or is absorbed by the soil, the fish are left therein soon to die, and it is to overcome this objectionable and undesirable feature that the present invention has been designed.

The invention still further resides in the provision of means in the nature of a suitable float member having an adjustable pipe section secured thereto, which arrangement causes the said pipe section to rise and fall with the rise and fall of the water within the supply tank of the irrigating ditch.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is a longitudinal sectional view illustrating the application of the invention; Fig. 2 is an enlarged longitudinal sectional view of a portion of the adjustable pipe section and the means employed for adjusting or supporting the same; Fig. 3 is a section on the line 3—3 of Fig. 2; Fig. 4 is a top plan view of the adjustable pipe section with the float removed; and Fig. 5 is an elevation, partly broken away, of a modification.

Referring now to the drawings, wherein is illustrated the preferred form of my invention the numeral 1 designates the original water supply which in the present instance is represented as a river or lake, along the bank of which a supply tank 2 is disposed, the latter having a lift gate 3 suitably mounted at one end thereof to regulate the supply of water necessary to the operation of the invention. The irrigating ditch 4 receives its water supply through the medium of an inlet pipe leading thereinto the said pipe 5 being connected as at 6 to a vertically extending pipe 7 leading into the tank 2 and projecting upwardly from the base or bottom thereof a suitable distance. Arranged over the pipe 7 is a slightly enlarged pipe section 8 the lower end of which is open and the upper end of which is provided with an inwardly directed annular flange 9 to partially close the said pipe end and to limit the downward movement of the pipe section should the water within the tank become abnormally low. Rods 10 of which there are preferably three, extend upwardly from the pipe section 8 over which a suitable buoyant member or float 11 is arranged, the latter being loosely retained in proper place with respect to the rods 10 through the medium of cotter pins 12 extending transversely through apertures 13 formed within the said rods, this arrangement permitting the adjustment of the float 11 with respect to the pipe section 8 to regulate the water supply through an opening 14 formed by the annular flange 9. The rods 10 also form a check or screen to prevent the entrance of fish into the pipe section 8. Ribs 15 project laterally from the outer face of the pipe section 7 the outer edges of the said ribs being engaged by the inner wall of the adjustable pipe section 8, this arrangement of the said ribs with respect to the pipe section 8 causing the latter to at all times remain out of engagement with the pipe section 7 and to be telescopically held over and upon the said pipe section.

Referring now to the modification shown in Fig. 5, the float member 16 illustrated therein is provided with a pipe section 17 composed of any suitable light material, the said pipe section 17 being arranged over a stationary pipe section 18 as illustrated, the water supply in this instance however being admitted at the base of the pipe section 17 as indicated by the arrow in the said Fig. 5 and thence into the top of the pipe section 18, this arrangement of the pipe section, one over the other, preventing the entrance of fish into the supply pipe of the irrigating ditch.

When it is desired that the water supply should be regulated, that is, either increased or diminished, the pins 12 are removed and adjusted in the openings or apertures 13 provided therefor to the desired height, thereby determining or regulating the distance between the under face of the float 11 and the opening 14. The pipe section 8 being of light material, it will be seen that the float 11 normally supports the said pipe section and causes the said section to move or automatically adjust itself according to the rise and fall of the water within the tank 2. The float member 11 being loosely arranged over the rods 10, the said float is normally supported by reason of the water within the tank in engagement with the pins 12, which engagement effects an opening or space through which the water passes into the pipe 7 and thence to the inlet pipe 5 of the irrigating ditch.

It will be seen from the above, taken in connection with the accompanying drawings that a double check or guard is provided by the provision of the lift gate 3 of the water tank; that the adjustable pipe section is at all times positioned centrally over the stationary pipe section 7 by reason of the engagement between the said sections and the ribs 15; and that if desired, the water supply to the irrigating ditch may be entirely cut off by lowering the lift gate 3 and adjusting the float member 11 until the opening 14 of the pipe section is entirely closed.

In reduction to practice, I have found that the form of my invention, illustrated in the drawings and referred to in the above description, as the preferred embodiment is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. A fish guard for ditches including a supply tank, a ditch supply pipe extending thereinto, and means operated by the rise and fall of the water within the tank adapted to prevent fish from entering the said pipe, as and for the purpose set forth.

2. A fish guard for ditches including a supply tank, a ditch supply pipe extending thereinto, a pipe section adjustable vertically upon the said supply pipe, and a float secured loosely to the said pipe section for supporting the latter, as and for the purpose set forth.

3. A fish guard for ditches including a supply tank, a ditch supply pipe extending thereinto, an open end pipe section arranged over the said supply pipe, rods extending vertically from the top of the said pipe section and a float adjustably secured to the said rods adapted to support the said pipe section and automatically adjust the same according to the rise and fall of the water within the tank, as and for the purpose set forth.

4. A fish guard for ditches including a supply tank, a ditch supply pipe extending thereinto, an open end pipe section arranged to embrace the said supply pipe, an inwardly directed annular flange formed upon the top of the said pipe section for partially closing the mouth thereof, means for maintaining the said pipe section against lateral movement independent of the supply pipe, a float connected to the said pipe section adapted to support the latter and automatically adjust the same according to the rise and fall of the water within the tank.

5. A fish guard for ditches including a supply tank, a ditch supply pipe extending vertically thereinto, an open end pipe section arranged to embrace the said supply pipe, an inwardly directed annular flange formed upon the top of the said pipe section to partially close the mouth thereof, a plurality of ribs radiating from the said supply pipe adapted for engagement with the said pipe section for maintaining the latter against lateral movement independent of the said supply pipe, a plurality of parallel vertically extending rods projecting from the top of the said pipe section and a float member adjustably secured to the said rods adapted to support the pipe section and automatically adjust the same according to the rise and fall of the water within the tank.

In testimony whereof I affix my signature in presence of two witnesses.

FRED GIESENHAUS.

Witnesses:
C. S. GIESENHAUS,
A. D. SINCLAIR.